United States Patent [19]

Warner et al.

[11] Patent Number: 4,773,073
[45] Date of Patent: Sep. 20, 1988

[54] INJECTION LOCKED OSCILLATOR SYSTEM FOR PULSED METAL VAPOR LASERS

[75] Inventors: Bruce E. Warner, Livermore; Earl R. Ault, Dublin, both of Calif.

[73] Assignee: The United States Department of Energy, Washington, D.C.

[21] Appl. No.: 911,941

[22] Filed: Sep. 26, 1986

[51] Int. Cl.⁴ .............................................. H01S 3/098
[52] U.S. Cl. ........................................ 372/25; 372/18; 372/56; 372/71; 372/99; 372/103
[58] Field of Search ................. 372/56, 25, 101, 103, 372/99, 18, 70, 71

[56] References Cited

U.S. PATENT DOCUMENTS

| | | | |
|---|---|---|---|
| 4,375,684 | 3/1983 | Everett | 372/18 |
| 4,435,808 | 3/1984 | Javan | 372/25 |
| 4,625,315 | 11/1986 | Lemberger et al. | 372/18 |
| 4,686,485 | 8/1987 | Goldberg et al. | 372/18 |
| 4,689,794 | 8/1987 | Brosnan | 372/18 |

OTHER PUBLICATIONS

Irving Bigio et al.; "Injection Locking—Excimer Lasers", IEEE Journal of Quantum Electronics; vol. QE-19, No. 9, 9/1983; 1426–1436.

Moody et al.; "Simple Coupling—Unstable Resonators", Applied Optics, vol. 21, No. 24, pp. 4401–4403; 12/15/1982.

Primary Examiner—William L. Sikes
Assistant Examiner—Xuan T. Vo
Attorney, Agent, or Firm—P. Martin Simpson, Jr.; L. E. Carnahan; Judson R. Hightower

[57] ABSTRACT

An injection locked oscillator system for pulsed metal vapor lasers is disclosed. The invention includes the combination of a seeding oscillator with an injection locked oscillator (ILO) for improving the quality, particularly the intensity, of an output laser beam pulse. The present invention includes means for matching the first seeder laser pulses from the seeding oscillator to second laser pulses of a metal vapor laser to improve the quality, and particularly the intensity, of the output laser beam pulse.

8 Claims, 1 Drawing Sheet

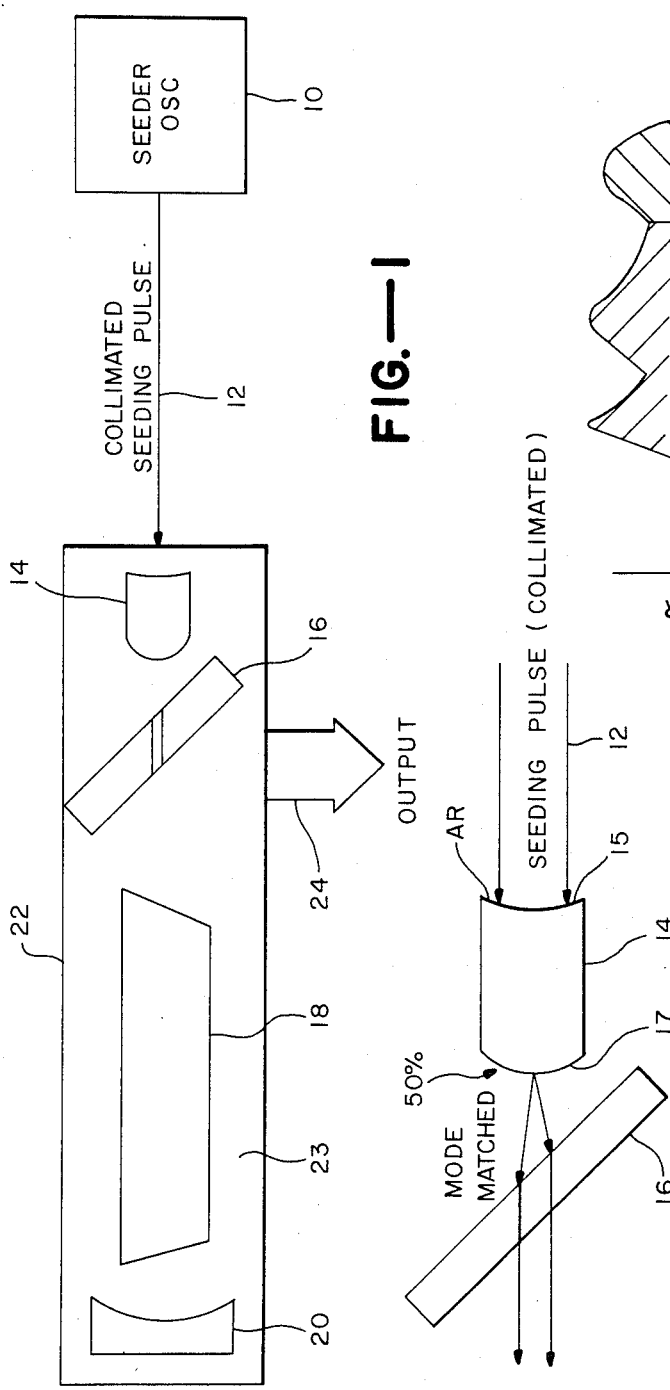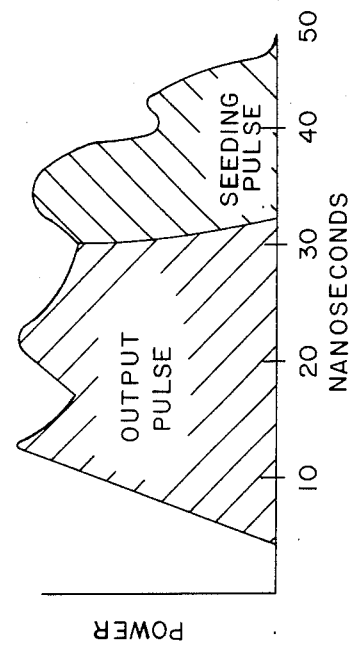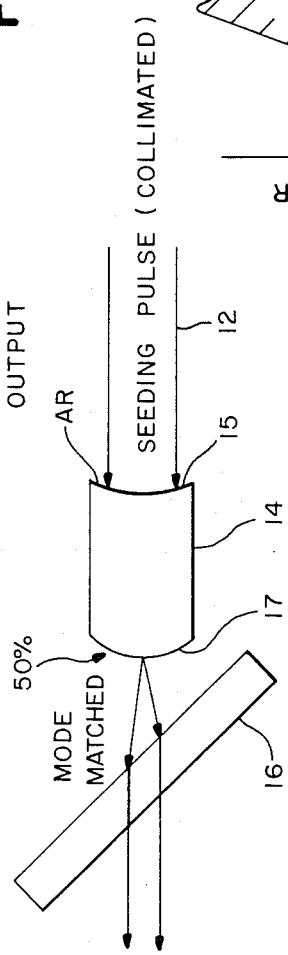

INJECTION LOCKED OSCILLATOR SYSTEM FOR PULSED METAL VAPOR LASERS

BACKGROUND OF THE INVENTION

The present invention relates to a pulsed laser system and more particularly to an injection locked oscillator. The U.S. Government has rights in this invention pursuant to Contract No. W-7405-ENG-48 between the U.S. Department of Energy and the University of California for operation under Lawrence Livermore National Laboratory.

More particularly, the present invention relates to an injection locked pulsed laser oscillator for use with an atomic vapor laser isotope separation (AVLIS) process.

In an AVLIS process, an atomic vapor, such as uranium vapor, is subjected to a very high quality pulsed laser beam in order to effect the photoionization of a desired isotope of the uranium vapor. The desired isotope is usually U235, which when "separated" from other uranium isotopes, is collected in a known fashion. The collected uranium has thus been "enriched" and can be utilized for atomic reactor purposes for generating electrical power. It is, of course, highly critical that the pulsed laser beam which is to be utilized for such an AVLIS process be of the highest quality in terms of pulse duration and power to effect the desired photoionization of the selected uranium isotope.

A problem with pulsed laser oscillators, particularly with a metal vapor laser such as a copper vapor laser, is that in stimulating lasing action, the best beam quality occurs at the end of the duration of the laser pulse wherein the least amount of light intensity occurs. This is due to the relatively long round trip time within the optical cavity, which is typically 15 nanoseconds. In general, it takes several round trips to establish a high quality optical mode. In particular, for a laser beam pulse of 50 nanoseconds (ns) duration, the first 30 ns are generally not suitable in quality for use in an atomic vapor laser isotope separation (AVLIS) process. With pulsed laser oscillators, the beam divergence needs to be reduced sufficiently in order to be usable. Usually, there is a loss in energy and in addition the usable pulse length gets shorter (typically 20 ns or so).

The lasing action of some pulsed laser oscillators are stimulated by the noise within the cavity itself. Another well known way of stimulating a lasing action of a pulse is by using an injection locked oscillator (ILO) wherein a first "seeding" oscillator is used to generate a pulsed beam which is injected or seeded into the ILO cavity. With regard to a pulsed metal vapor laser, it is necessary for the seeding pulse to match the desired mode (mode matching) of the laser cavity of the ILO. This is due in part to the absorptive nature of the gain media prior to its pulse. A non-mode matched seeding pulse must execute several round trips before it efficiently couples light out of the optical cavity. In a pulsed metal vapor laser, these extra round trips diminish the seeding intensity due to absorption. A mode matched pulse needs no extra round trips and therefore suffers no absorption losses prior to gain extraction. The resultant injection locked oscillator has a high quality optical beam over its entire gain inversion time, which is longer than an oscillator without injection locking, and has a slightly higher output power ($\sim$10-20%).

SUMMARY OF THE INVENTION

It is an object of the present invention to provide an improved pulsed laser oscillator.

It is a more particular object of the present invention to provide an injection locked oscillator for use with pulsed lasers.

Briefly, the present invention includes a pulsed metal vapor laser comprising a laser cavity having means for reflecting stimulated metal vapor laser pulses out from the cavity, means for stimulating the lasing of first metal vapor seeding laser pulses of a first duration to be injected into the cavity, means for injecting the first seeding laser pulses through the reflecting means into said laser cavity to stimulate lasing of second laser pulses which have a longer duration than the first laser pulse.

The pulsed metal vapor laser also includes means for taking a collimated first laser pulse and injecting it into the laser cavity which has surfaces of a predetermined curvature for matching the mode of the first seeding pulse to a desired second mode of the second pulse of the laser cavity.

Additional objects, advantages and novel features of the present invention will be set forth in part in the following description and will in part become apparent to those skilled in the art upon examination of the following, or may be learned by practice of the invention. The objects and advantages of the present invention may be realized and obtained by means of the instrumentalities and combinations which are pointed out in the claims.

BRIEF DESCRIPTION OF THE DRAWINGS

The accompanying drawings, which are incorporated in and form a part of this specification, illustrate an embodiment of the invention and, together with the description, serve to explain the principles of the invention.

FIG. 1 depicts a block diagram of an improved injection locked oscillator according to the present invention.

FIG. 2 depicts a more detailed portion of the system of FIG. 1.

FIG. 3 depicts a graph illustrating the comparison between an output pulse and a "seeding" pulse, according to the present invention.

DETAILED DESCRIPTION OF THE DRAWINGS

Reference will now be made in detail to the preferred embodiment of the invention, an example of which is illustrated in the accompanying drawings. While the invention will be described in conjunction with that preferred embodiment, it will be understood that it is not intended to limit the invention to that embodiment. On the contrary, it is intended to cover alternatives, modifications and equivalents, which may be included within the spirit and scope of the invention as defined by the accompanying claims.

The present invention is illustrated in FIG. 1, wherein a seeding oscillator 10 provides a laser pulse 12 of approximately 20 nanoseconds in duration. The portion of the seeding pulse is illustrated in FIG. 3 in the shaded area identified as the seeding pulse.

The seeding pulse is input to an injection means 14, as indicated in FIG. 1, which "seeds" or injects the seeding pulse into the ILO oscillator 22.

The ILO 22 includes a scraper mirror 16 which forms one end of the laser cavity 23 and couples the seeding pulse into the laser head 18. ILO 22 also includes a reflection mirror 20. Any laser pulse stimulated into lasing by a seeding pulse 12 is reflected from the ILO 22 by scraper mirror 16 in the form of output pulse 24.

FIG. 2 depicts in more detail the aspects of the invention, wherein the seeding pulse 12 is collimated by a first surface 15 of injection means 14, which has a specified anti-reflection coating so that the seeding pulse can be collimated in a proper fashion. The injection means 14 also includes a second output surface 17 having a particular radius of curvature which is specified to "mode match" the desired output pulse 24 from ILO 22. The mode matched seeding pulse is then input through scraper mirror 16 into the ILO cavity 23.

The resulting output pulse 24 from ILO 22 is much closer to the desired duration of a 50 nanosecond pulse, as indicated in FIG. 3. The usable output pulse can be increased dramatically over prior art approaches.

In FIG. 2, the injection means includes the first surface 15 which is anti-reflection coated for 510 and 578 nm (nanometers) and the second output surface 17, which is typically coated to provide 50% reflection and 50% transmission for 510, 578 nm, each has a specified radius of curvature to provide the appropriate mode matching.

The present invention provides for stimulation of lasing action within an ILO cavity. While two laser oscillators are in general required, the advantages of the present invention provides for gaining full pulse length of 50 nanoseconds with low beam divergence.

A more uniform pulse is generated and the desired 50 nanosecond pulse duration can be approached. In addition, the seeding oscillator can be utilized with much less power for stimulating the lasing action for the full pulse duration. Other embodiments could include hybrid type apparatus incorporating the ILO and a seeding oscillator of a design different from the ILO.

The foregoing description of the preferred embodiment of the invention has been presented for purposes of illustration and description. It is not intended to be exhaustive or to limit the invention to the precise form disclosed and many modifications and variations are possible in light of the above teaching. The preferred embodiment has been chosen and described in order to best describe the principles of the invention, and its practical applications, to thereby enable others skilled in the art to best utilize the invention and various embodiments with various modifications as are suited to the particular use contemplated. It is intended that the scope of the invention be defined only by the claims appended hereto.

What is claimed:

1. A pulsed laser comprising
   a metal vapor laser cavity including a reflection means for reflecting stimulated laser pulses out from said cavity,
   means for stimulating the lasing of first seeder laser pulses, each of a first duration and a first mode, to be injected into said laser cavity,
   means for injecting said first laser pulses through said reflection means into said laser cavity to stimulate lasing of second laser pulses, each of said second laser pulses having a second mode and a longer duration than said first laser pulses, said means for injecting including
   means for matching the mode of said first pulses to the second desired mode of said second pulses of said laser cavity wherein said means for injecting include means for collimating said first pulses for injection into said laser cavity and wherein said means for matching are formed by input/output surfaces of a predetermined curvature on the collimating means, where the input surface is anti-reflection coated and the output surface has predetermined reflection and transmission characteristics.

2. A laser as in claim 1, wherein said reflection means is a scraper mirror.

3. A laser as in claim 2, wherein said first pulse is approximately 20 nanoseconds of duration.

4. A laser as in claim 3 wherein said second pulse is approximately 50 nanoseconds of duration.

5. A laser as in claim 4, where the output surface is approximately fifty percent reflecting and fifty percent transmitting.

6. A laser as in claim 1, including a seeder oscillator and injection locked oscillator in hybrid form.

7. A pulsed laser for use in an atomic vapor laser isotope separation process, said pulsed laser comprising
   a metal vapor laser cavity including a reflection means for reflecting stimulated laser pulses out from said cavity,
   means for stimulating the lasing of first seeder laser pulses, each of a first duration and a first mode, to be injected into said laser cavity,
   means for injecting said first laser pulses through said reflection means into said laser cavity to stimulate lasing of second laser pulses, each of said second laser pulses having a second desired mode and a longer duration than said first laser pulses, and
   means for matching the mode of said first pulses to the second desired mode of said second pulses of said laser cavity wherein said means for injecting include means for collimating said first pulses for injection into said laser cavity and wherein said means for matching are formed by input/output surfaces of a predetermined curvature on the collimating means, where the input surface is anti-reflection coated and the output surface has predetermined reflection and transmission characteristics.

8. The laser of claim 7 where the output surface is approximately fifty percent reflecting and fifty percent transmitting.

* * * * *